(12) United States Patent
Yost et al.

(10) Patent No.: US 7,428,375 B2
(45) Date of Patent: Sep. 23, 2008

(54) CORRELATED AUTO-FOCUS STABILIZATION METHOD AND DIGITAL CAMERA

(75) Inventors: Jason Yost, Windsor, CO (US); Christopher A. Whitman, Fort Collins, CO (US); Gregory Hofer, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 286 days.

(21) Appl. No.: 11/112,515

(22) Filed: Apr. 22, 2005

(65) Prior Publication Data

US 2006/0239672 A1    Oct. 26, 2006

(51) Int. Cl.
*G03B 13/32*     (2006.01)
*G03B 3/00*      (2006.01)

(52) U.S. Cl. .................... 396/52; 396/123; 348/208.14; 348/352

(58) Field of Classification Search .............. 396/52, 396/121, 123, 95; 348/352, 208.14
See application file for complete search history.

(56) References Cited

U.S. PATENT DOCUMENTS

| 5,210,566 A * | 5/1993 | Nishida ............... 396/123 |
| 2006/0066744 A1* | 3/2006 | Stavely et al. ........... 348/352 |

\* cited by examiner

*Primary Examiner*—W. B. Perkey
*Assistant Examiner*—Rishi S Suthar

(57) ABSTRACT

Auto-focus in a digital camera is improved by stabilizing successive images. Each auto-focus image is correlated to previous images so that scene movement or motion can be tracked. The area in the scene where focus figure-of-merit is computed is adjusted according to the amount of scene movement. Also, two separate focus frames may be compared to determine the direction and speed of the motion. This improves the accuracy of the focus figure-of-merit which results in fewer autofocus failures.

9 Claims, 18 Drawing Sheets

50

```
┌─────────────────────────────────────────────┐
│ TAKE A SUCCESSIVE NUMBER OF AUTO-FOCUS      │─ 51
│ IMAGES, EACH AT A UNIQUE POSITION OF        │
│ THE FOCUS LENS                              │
└─────────────────────────────────────────────┘
                    │
                    ▼
┌─────────────────────────────────────────────┐
│ CORRELATE EACH RESPECTIVE AUTO-FOCUS        │─ 51
│ IMAGE WITH A PORTION OF A REFERENCE         │
│ IMAGE TO TRACKSCENE MOTION                  │
└─────────────────────────────────────────────┘
                    │
                    ▼
┌─────────────────────────────────────────────┐
│ ADJUST THE POSITION OF THE AREA IN THE IMAGE│─ 51
│ WHERE FOCUS FIGURE-OF-MERIT IS COMPUTED     │
│ ACCORDING TO THE AMOUNT OF SCENE MOTION     │
│ THAT IS DETERMINED SO THAT RESPECTIVE       │
│ FIGURES-OF-MERIT ARE CALCULATED FOR         │
│ SEQUENTIAL AUTO-FOCUS IMAGES USING          │
│ THE SAME SCENE LOCATION                     │
└─────────────────────────────────────────────┘
                    │
                    ▼
┌─────────────────────────────────────────────┐
│ MOVE THE FOCUS LENS TO THE LOCATION THAT    │─ 51
│ PRODUCES THE HIGHEST FIGURE-OF-MERIT        │
└─────────────────────────────────────────────┘
```

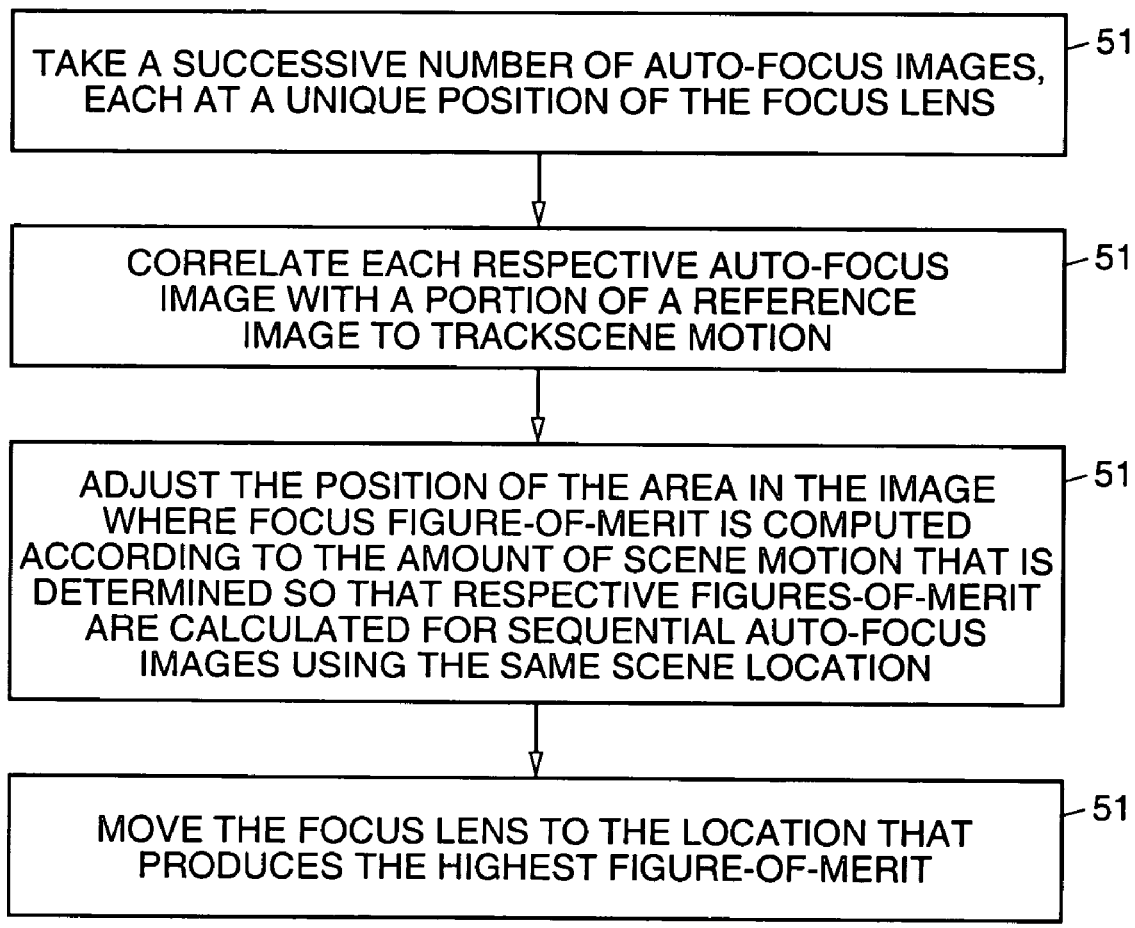

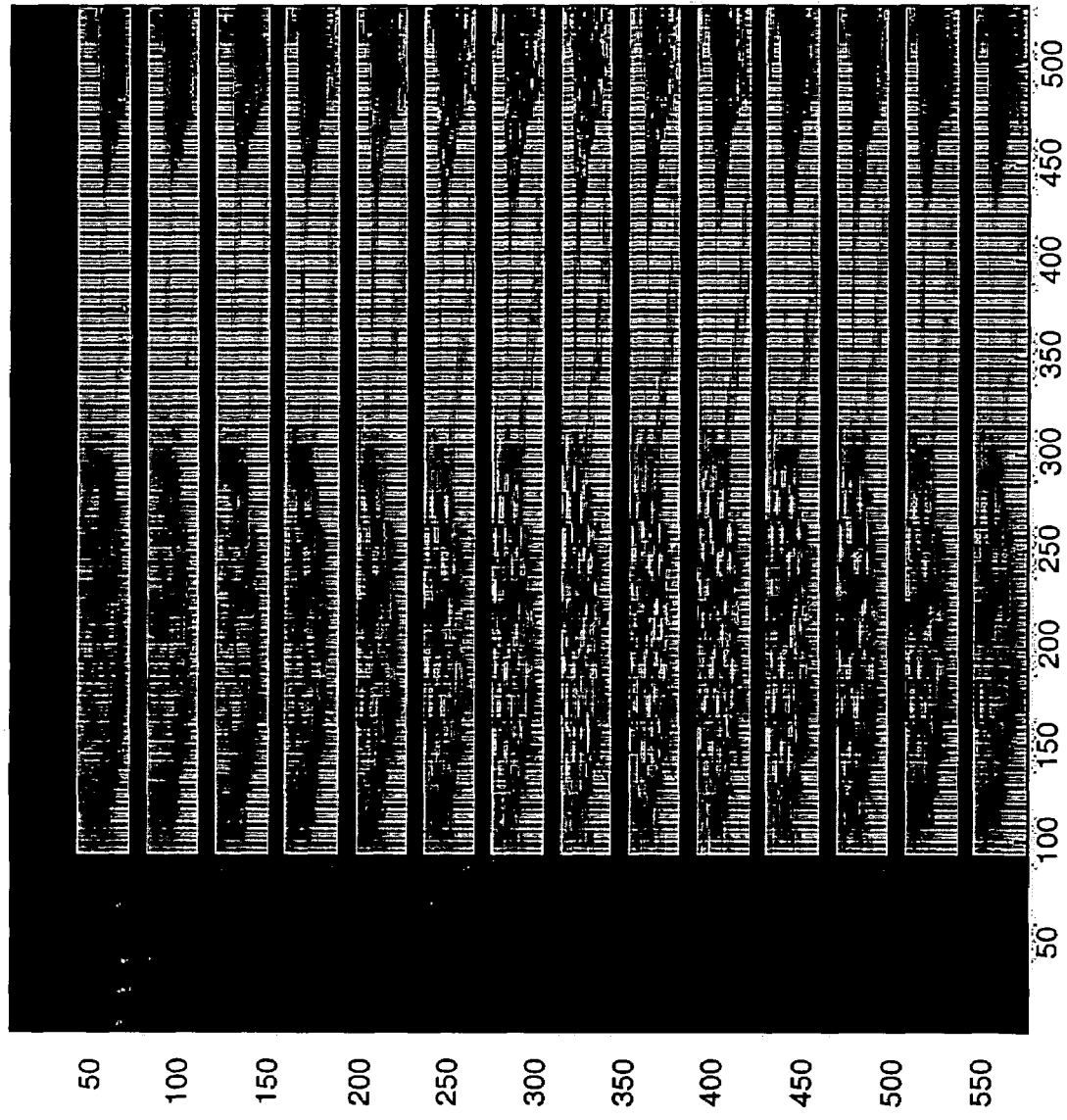

CORRELATED AUTO-FOCUS STABILIZATION METHOD AND DIGITAL CAMERA

TECHNICAL FIELD

The present invention relates generally to digital cameras and methods having stabilized focus images.

BACKGROUND

Digital cameras often have problems when focusing on moving subjects or when people shake hands, for example. Auto-focus algorithms employed in auto-focus systems used in the cameras often miss intended focus, resulting in a blurred image. The focus failures are most prevalent when a user is panning the camera or the subject is moving, either of which appears as scene motion to the auto-focus system.

Digital camera focus algorithms often capture small focus images on a CCD array or sensor of the camera and then move the focus lens motor. A focus figure-of-merit is calculated for each of these "focus captures" which measures how in-focus a focus measurement (focus capture) is.

Motion of the camera or motion in the scene can cause the figure-of-merit to be incorrect when compared with previous focus measurements (focus captures). The focus figure-of-merit is very sensitive to scene motion because it typically relies on an edge detection scheme that requires edge content in the scene to remain constant.

It would be desirable to stabilize the auto-focus images so that the figure-of-merit can be computed for the scene that is more consistent between iterations of the auto-focus algorithm.

BRIEF DESCRIPTION OF THE DRAWINGS

The various features and advantages of embodiments of the present invention may be more readily understood with reference to the following detailed description taken in conjunction with the accompanying drawings, wherein like reference numerals designate like structural elements, and in which:

FIG. 1c is a flow diagram that illustrates an exemplary embodiment of an auto-focus method in accordance with the principles of the present invention that may be employed in the digital camera shown in FIGS. 1a and 1b;

FIG. 2b illustrates successive photographs taken of the flowers shown in FIG. 2 stabilized using the present invention;

DETAILED DESCRIPTION

Figure 1A:
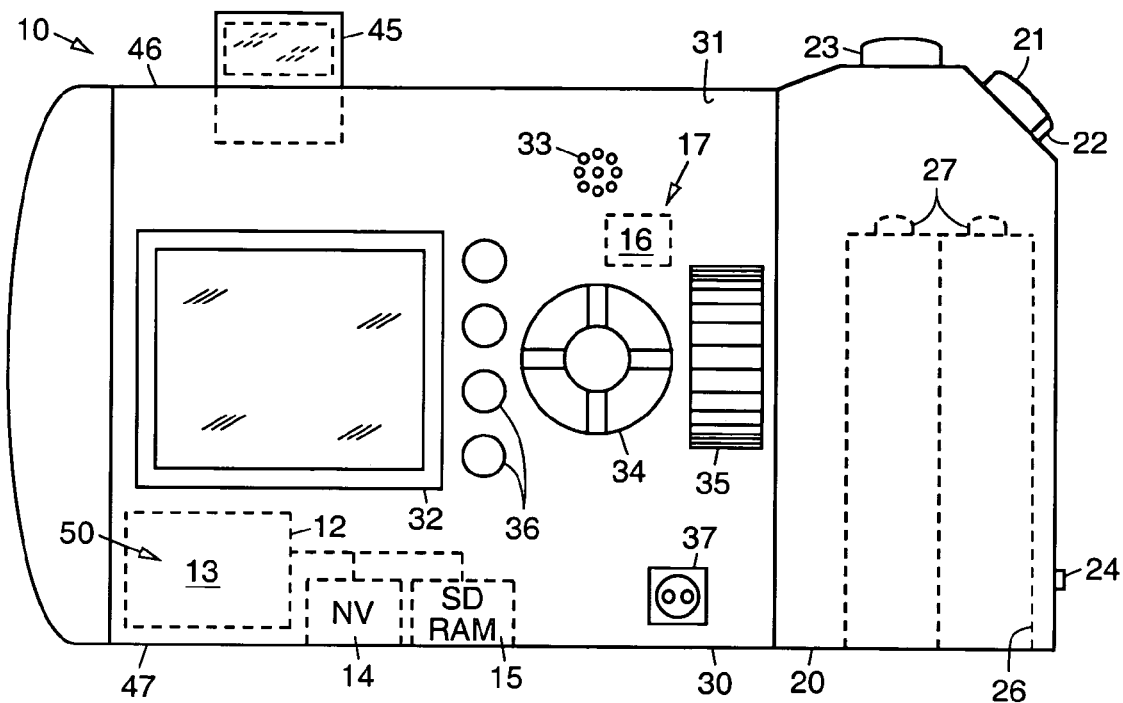
FIGS. 1a and 1b illustrate rear and front views, respectively, of an exemplary embodiment of an digital camera implemented in accordance with the principles of the present invention.
Figure 1B:
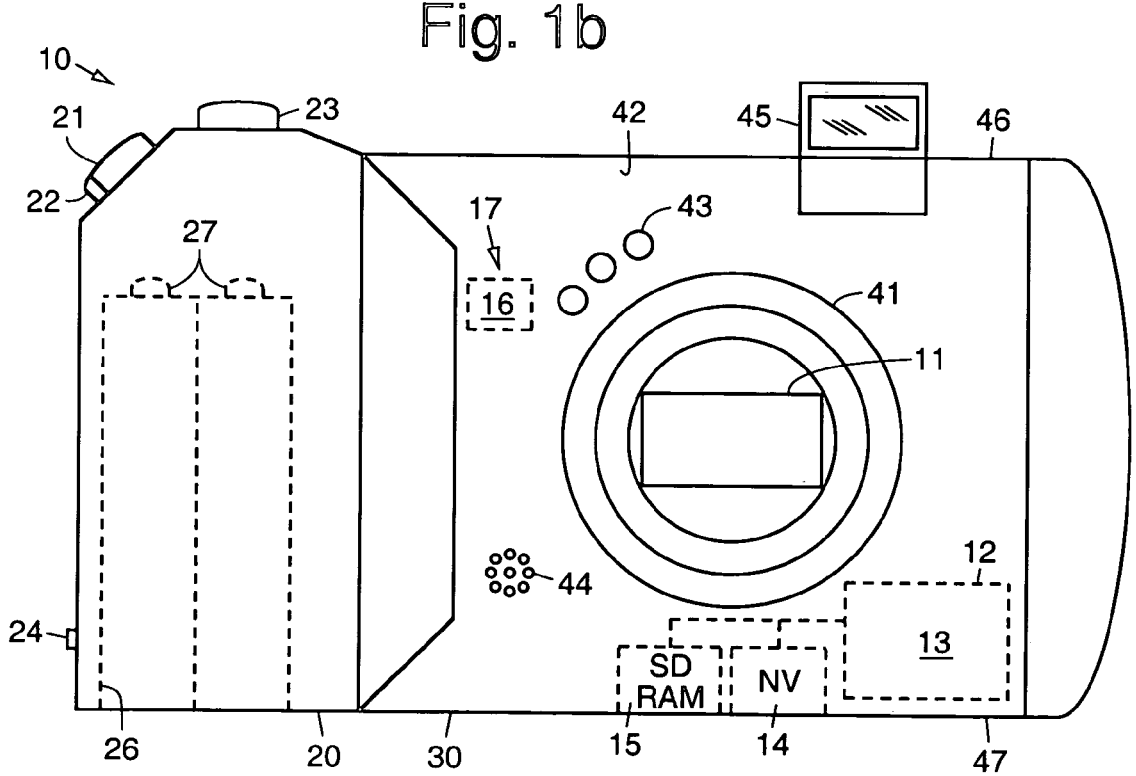

Referring to the drawing figures, FIGS. 1a and 1b are rear and front views, respectively, of an exemplary digital camera 10 implemented in accordance with the principles of the present invention. As is shown in FIGS. 1a and 1b, the exemplary digital camera 10 comprises a handgrip section 20 and a body section 30. The handgrip section 20 includes a power button 21 or switch 21 having a lock latch 22, a record button 23, a strap connection 24, and a battery compartment 26 for housing batteries 27. The batteries may be inserted into the battery compartment 26 through an opening adjacent a bottom surface 47 of the digital camera 10.

As is shown in FIG. 1a, a rear surface 31 of the body section 30 comprises a liquid crystal display (LCD) 32 or viewfinder 32, a rear microphone 33, a joystick pad 34, a zoom control dial 35, a plurality of buttons 36 for setting functions of the camera 10 and a video output port 37 for downloading images to a computer, for example. As is shown in FIG. 1b, a lens system has a focus lens 41, that extends from a front surface 42 of the digital camera 10. The lens system may also include a zoom feature. A metering element 43 and front microphone 44 are disposed on the front surface 42 of the digital camera 10. A pop-up flash unit 45 is disposed adjacent a top surface 46 of the digital camera 10.

An image sensor 11 is coupled to processing circuitry 12 (illustrated using dashed lines) that are housed within the body section 30, for example. An exemplary embodiment of the processing circuitry 12 comprises a microcontroller (μC) 12 or central processing unit (CPU) 12. The μC 12 or CPU 12 is coupled to a nonvolatile (NV) storage device 14, and a high speed (volatile) storage device 15, such as synchronous dynamic random access memory (SDRAM) 15, for example.

The processing circuitry 12 is coupled to a focus motor 16 that is coupled to and controls the position of the focus lens 41, of the camera 10. The focus motor 16 is typically a digitally controlled servo motor 16. The processing circuitry 12 (microcontroller (μC) 12 or CPU 12) comprises firmware 13 that controls various operations of the camera 10. The processing circuitry 12, focus motor 16, focus lens 41, and firmware 13 implement an auto-focus system 17 (generally designated).

The firmware 13 embodied in the processing circuitry 12 of the digital camera 10 comprising an autocalibration method 50 or algorithm 50 in accordance with the principles of the present invention. This will be discussed in more detail with reference to FIG. 1c.

FIG. 1c is a flow diagram that illustrates an exemplary embodiment of an auto-focus method 50 or algorithm 50 in accordance with the principles of the present invention that may be implemented in the firmware 13 employed in the digital camera 10 shown in FIGS. 1a and 1b. The exemplary auto-focus method 50 or algorithm 50 is implemented as follows.

A successive number of auto-focus images are taken 51, each at a unique position of the focus lens 41. Each respective auto-focus image is correlated 52 with a portion of a reference image to track scene motion, wherein an area of each image where focus figure-of-merit is computed is compared to the corresponding area in the reference image to determine the direction and speed of the motion between the images. The area in the image where focus figure-of-merit is computed is adjusted 53 or offset 53 according to the amount of scene motion that is determined so that the respective figures-of-merit calculated for sequential auto-focus images (image focus captures) use the same scene location. The focus lens 41 is moved 54 based upon the figure-of-merit of the stabilized image to the location that produces the highest figure-of-merit.

By way of example, the auto-focus system in a digital camera 10 will often take 10 to 20 consecutive images, each at a unique focus lens position. The auto-focus algorithm 13 computes the focus quality (figure-of-merit) on a small portion of these images and moves the lens 41 to the location that produces the highest figure-of-merit.

The present invention tracks image motion between the images. by overlaying a portion of a reference image onto the current image and performing a pixel by pixel subtraction. The reference image can be either the most recent image or the image that was recorded closest to the current focus lens position.

This overlay subtraction is done at M by N locations. By summing the pixel differences at each of the M×N locations, a M×N correlation map is created. This map typically has a minimum where the images match each other best (i.e., image registration). The location of this minimum in the M×N map is used to find the amount of scene motion between the reference image and the current image.

The location of the figure-of-merit computation within the current image is offset according to the amount of motion that occurs so that the figure-of-merit is performed on a "stabilized" image. The focus lens 41 is moved based upon the figure-of-merit of the stabilized image.

More particularly, to detect motion between two focus captures (images or frames), differences are calculated. The two frames may be referred to as an object frame and an offset motion frame. These two frames are captured such that an upper left corner of the image is in the same place in the scene as if no motion has occurred. To detect motion, the motion frame is offset some distance in the x and y direction and an absolute difference is calculated between the offset motion frame and the object frame. The differences are summed at every pixel location to create a single value for that position of the motion frame.

An iteration is performed over a distance in the x and y direction calculating the absolute difference for every deltaX and deltaY. This results in an array of values from which a the minimum can be determined. The minimum summed absolute difference yields the most likely position of the motion frame as compared to the object frame. Since the time that passed between captures is known, the direction and speed of any motion that has occurred can be determined. After this motion is detected the next focus capture is adjusted so that it compensates for the motion.

Figure 2:
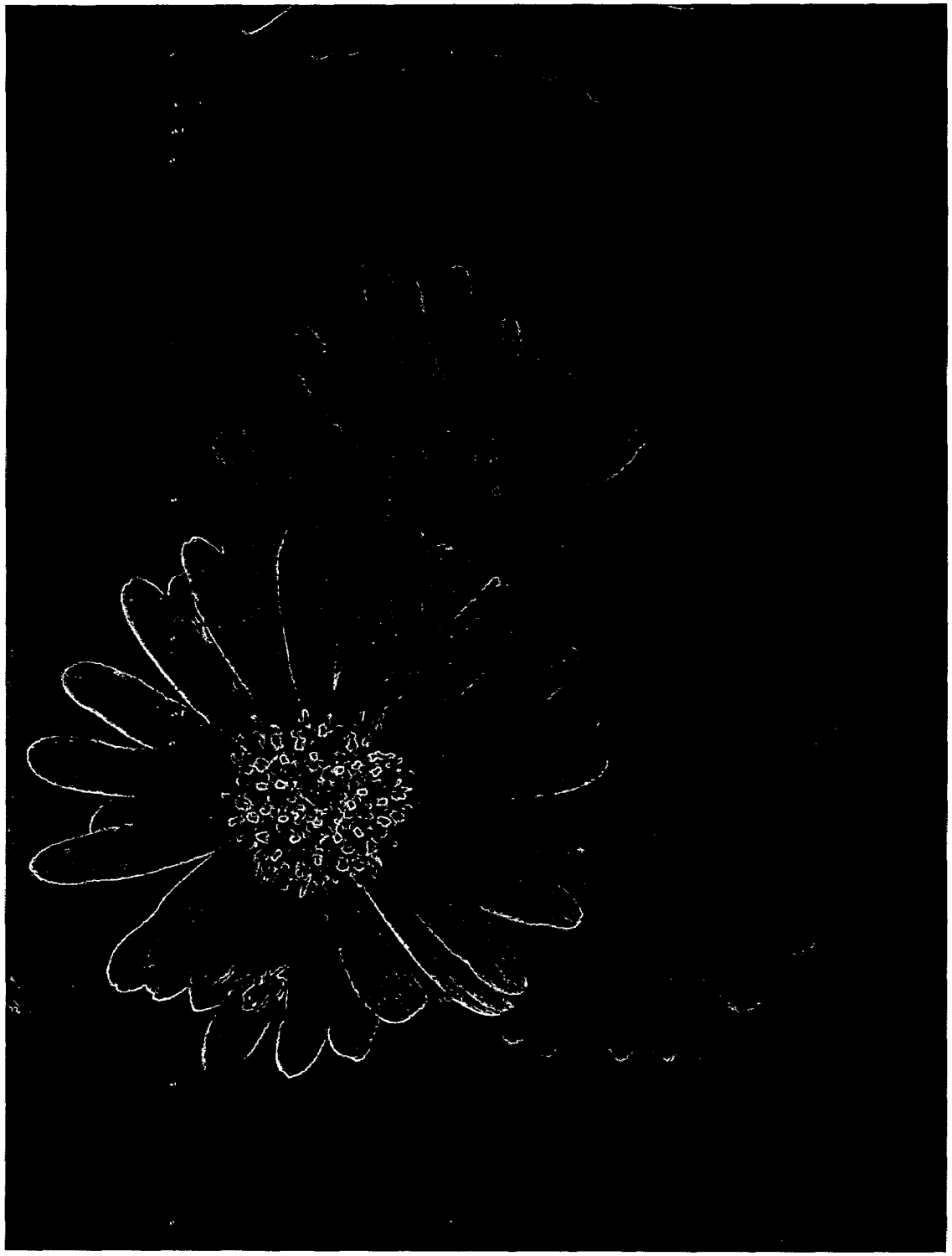
FIG. 2 illustrates an exemplary image of flowers.
Figure 2A:
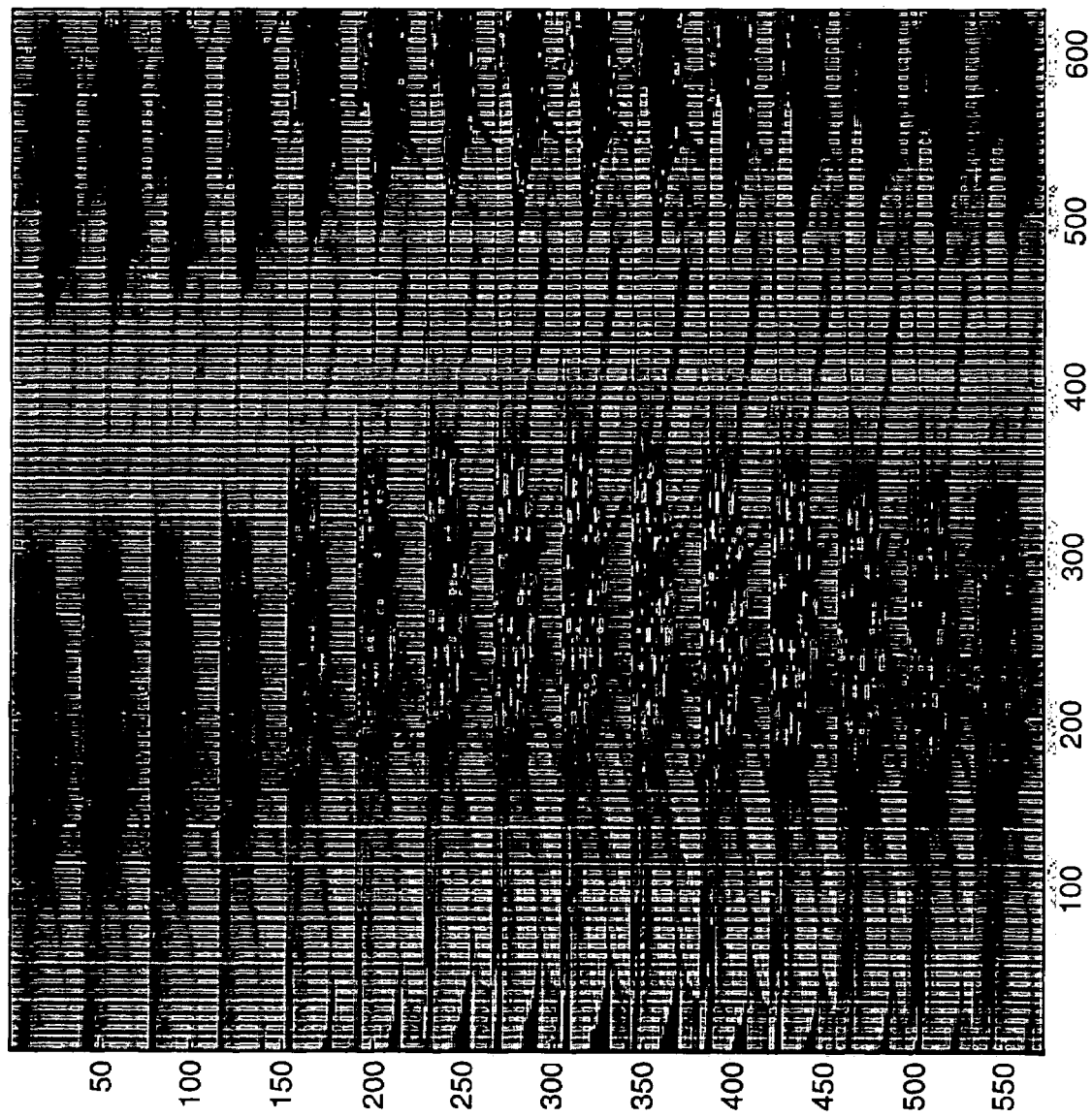
FIG. 2a illustrates successive unstabilized photographs taken of the flowers shown in FIG. 2.

Testing has been done to prove out the principles of the present invention. FIGS. 2-11 illustrate stabilization test results using the present invention. FIG. 2 illustrates an exemplary image of flowers taken with the digital camera. FIGS. 2*a* and 2*b* respectively illustrate successive unstabilized and stabilized images of the flowers.

Figure 3:
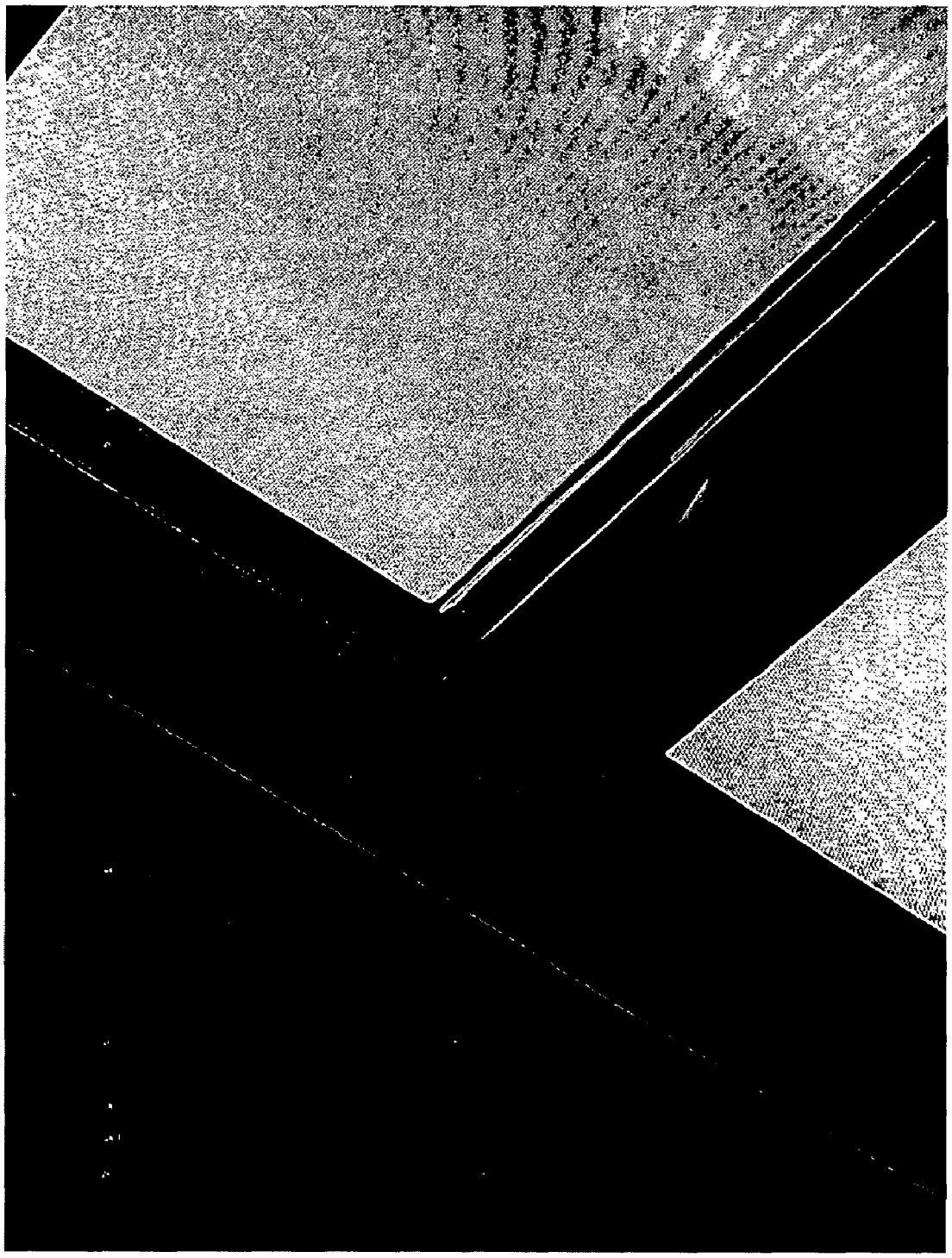
FIG. 3 illustrates an exemplary image of a window.
Figure 3A:
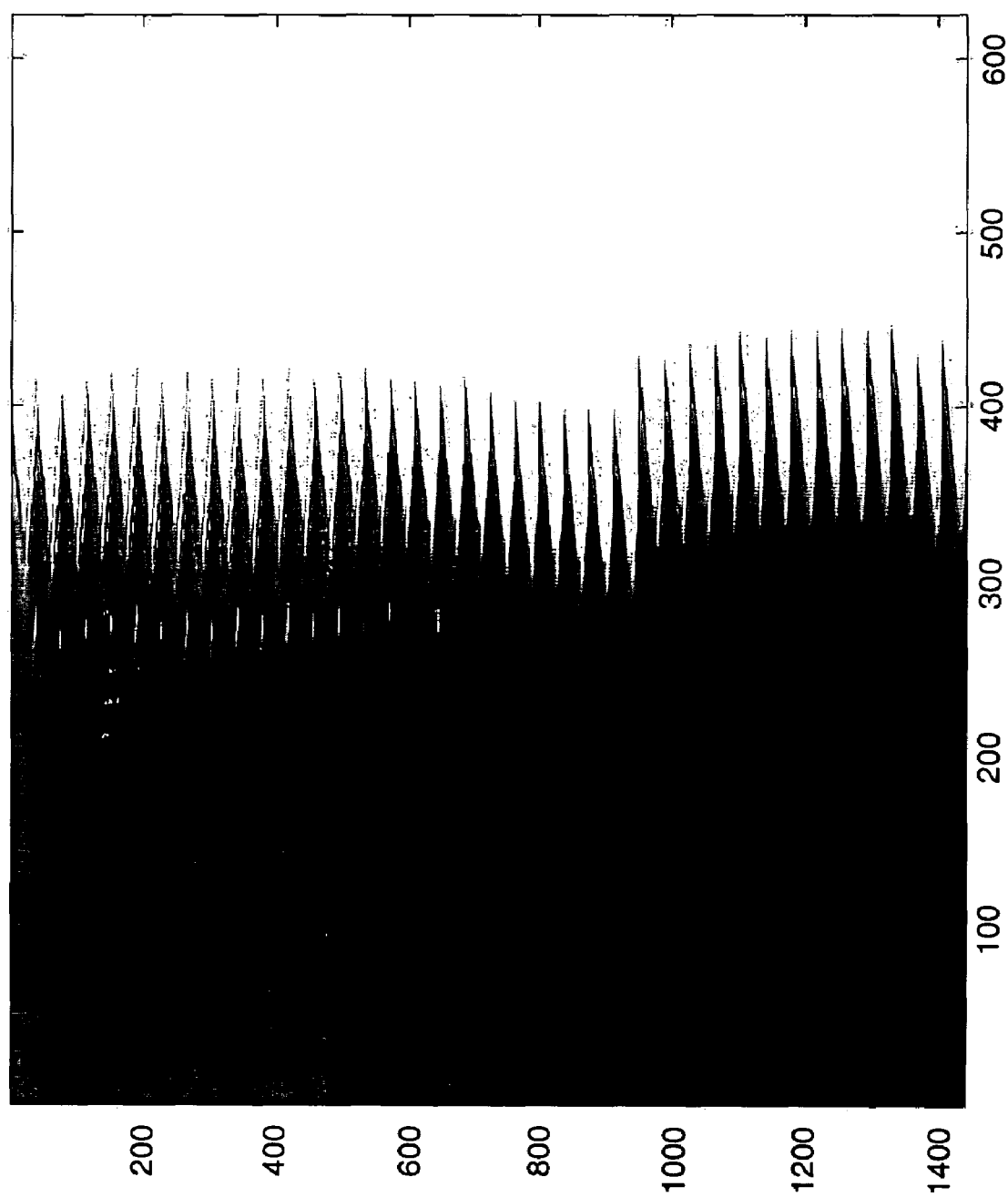
FIG. 3a illustrates successive unstabilized photographs taken of the window shown in FIG. 2.
Figure 3B:
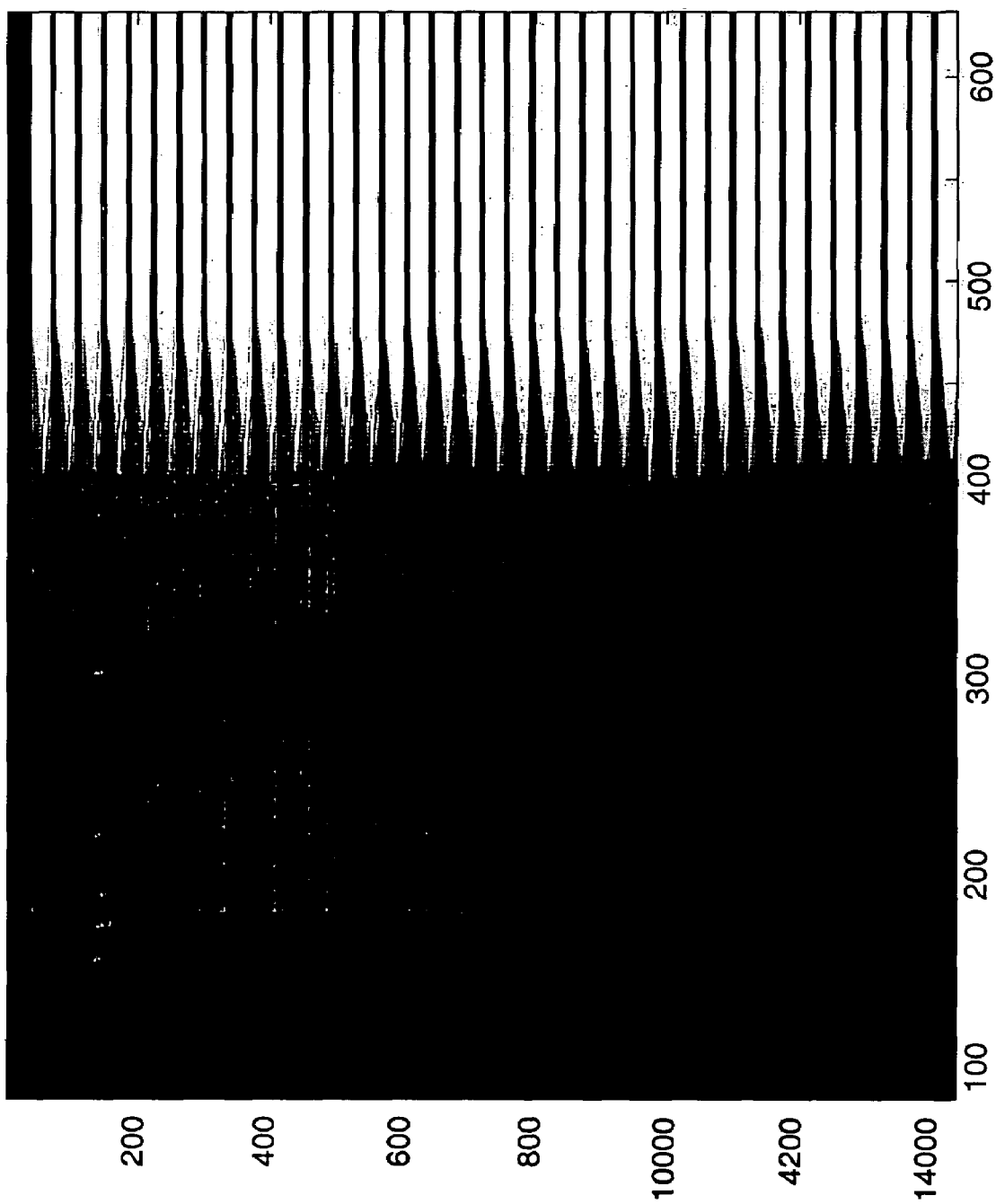
FIG. 3b illustrates successive photographs taken of the window shown in FIG. 2 stabilized using the present invention.

FIG. 3 illustrates an exemplary image of a window. FIGS. 3*a* and 3*b* respectively illustrate successive unstabilized and stabilized images of the window.

Figure 4:
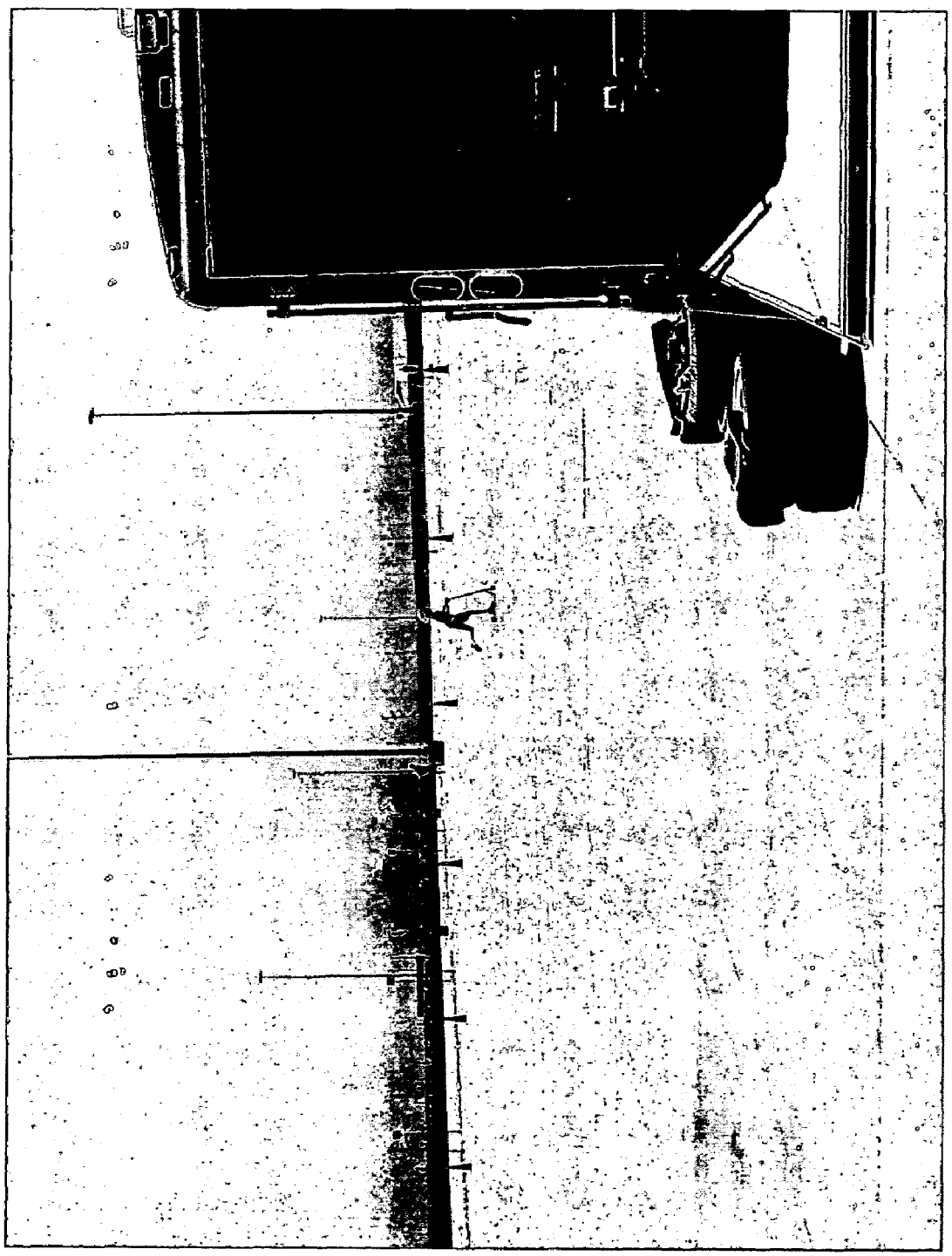
FIG. 4 illustrates an exemplary image of a scooter rider.
Figure 4A:
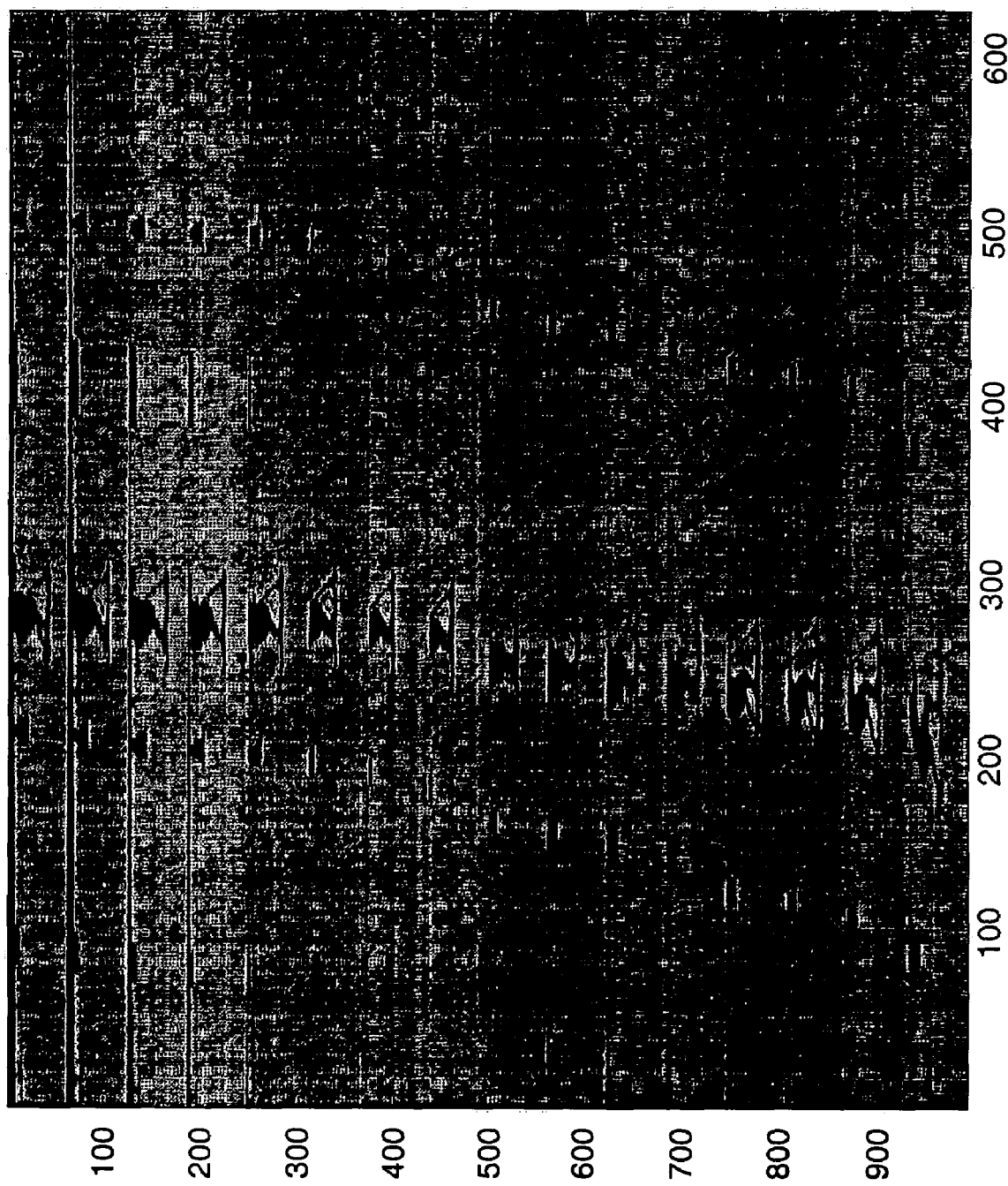
FIG. 4a illustrates successive unstabilized photographs taken of the scooter rider shown in FIG. 2.
Figure 4B:
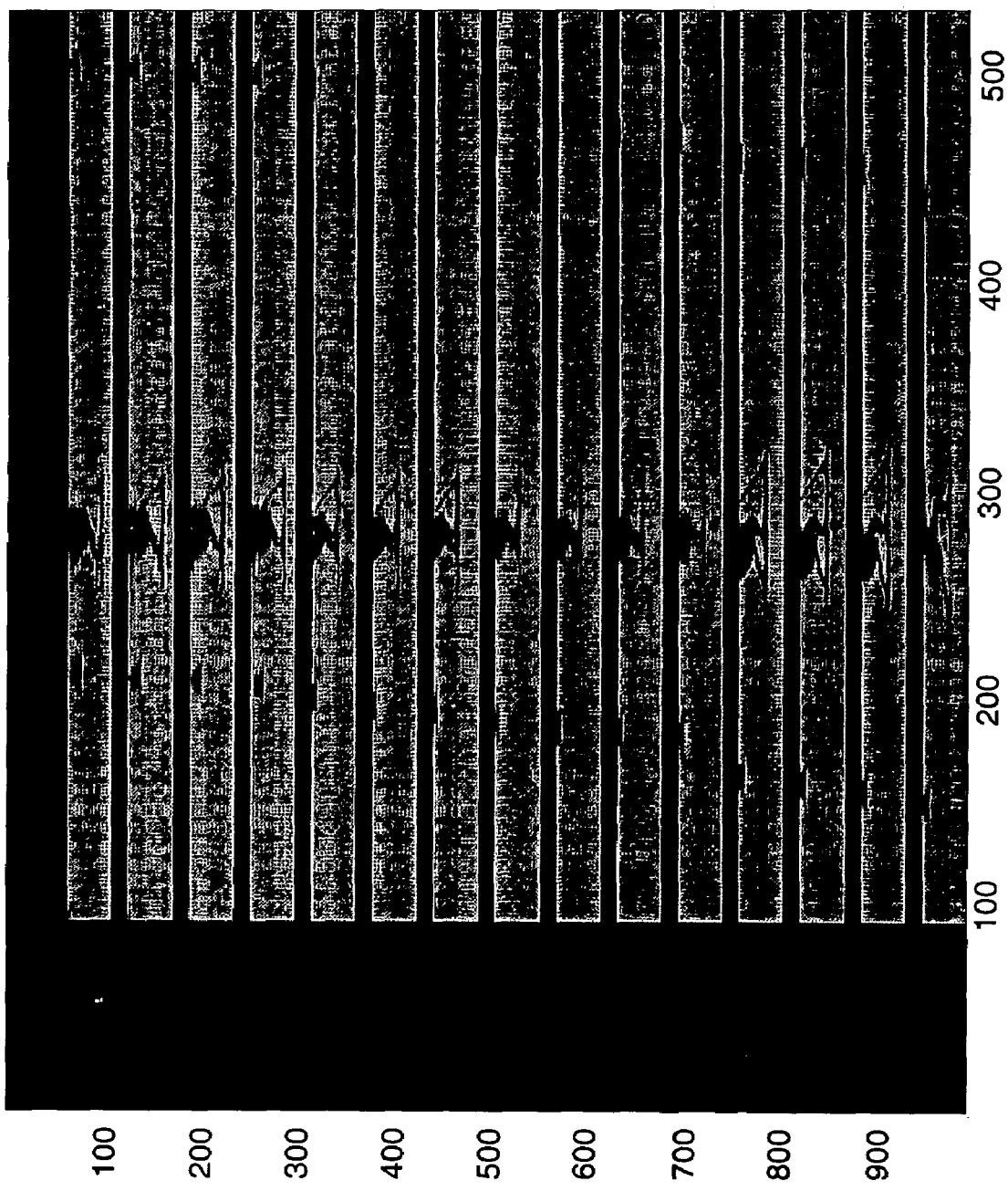
FIG. 4b illustrates successive photographs taken of the scooter rider shown in FIG. 2 stabilized using the present invention.

FIG. 4 illustrates an exemplary image of a scooter rider. FIGS. 4*a* and 4*b* respectively illustrates successive unstabilized and stabilized images taken of the scooter rider.

FIGS. 5-8 illustrates exemplary correlation map plots for two successive images from different types of image scenes. In these plots, the second image is compared to the first image at 100 horizontal locations and 6 vertical locations. X and Y dimensions in the plot are in pixels. The Z dimension corresponds to a sum-of-absolute-differences.

Figure 5:
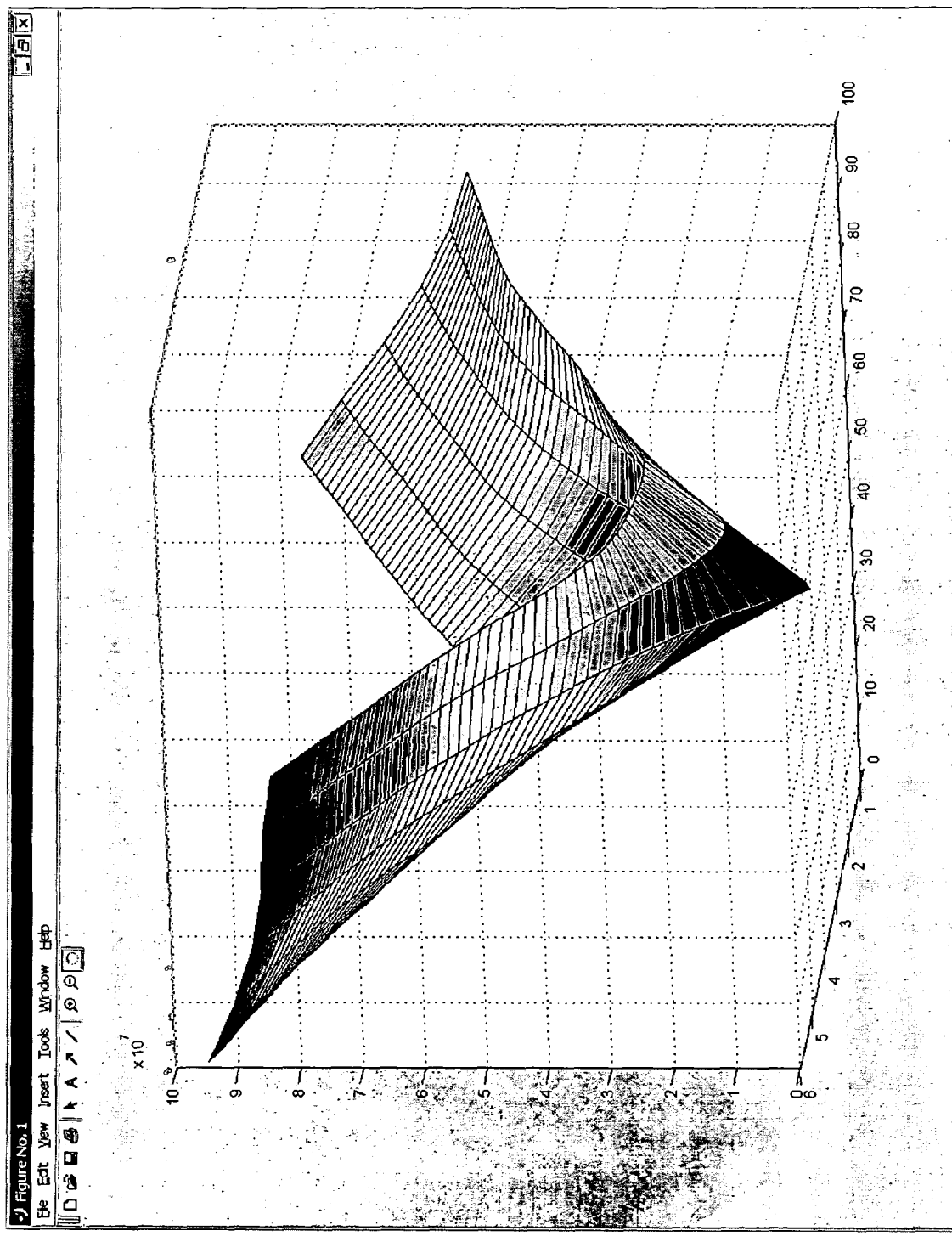
FIG. 5 illustrates an exemplary correlation map plot for two successive images.
Figure 6:
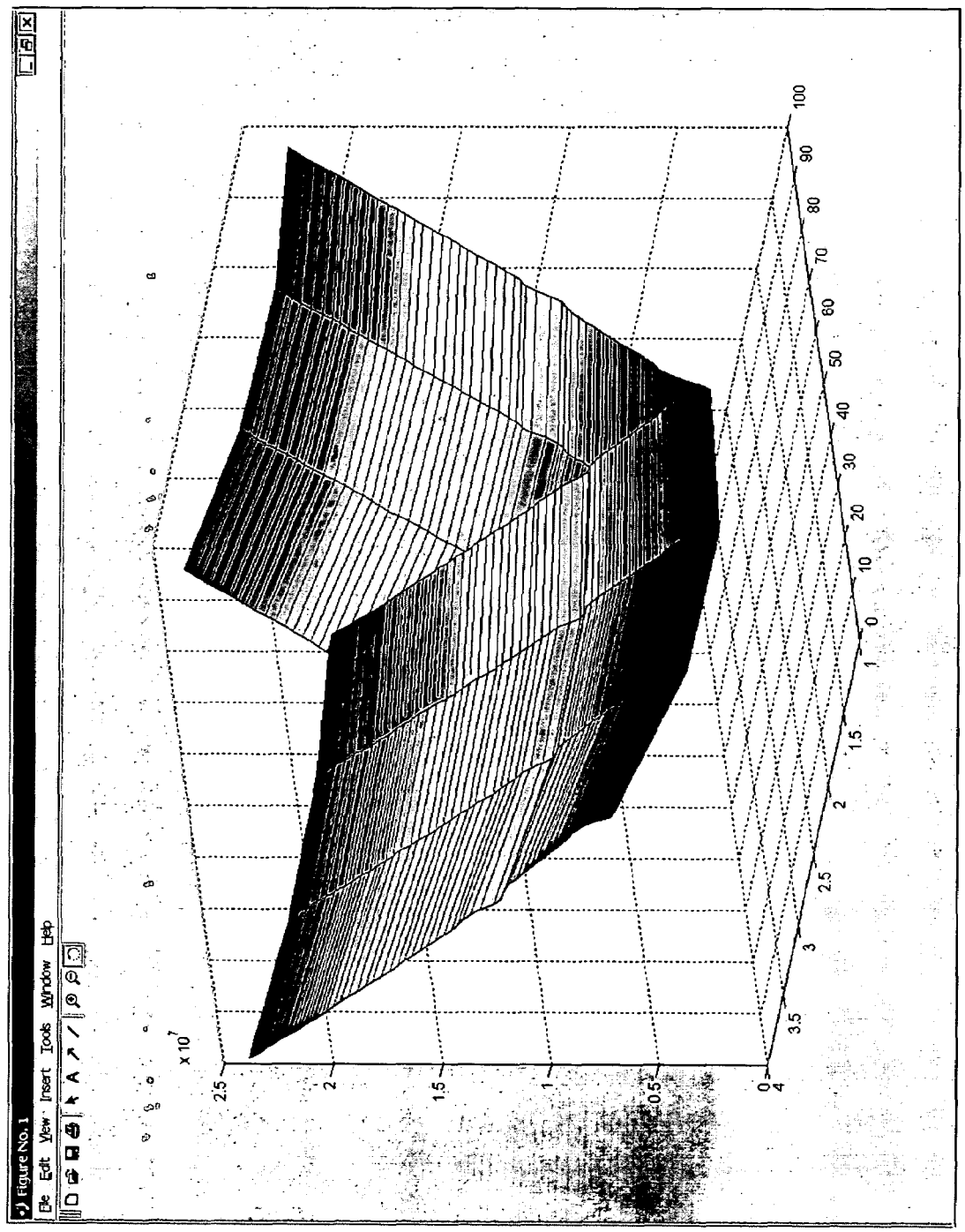
FIG. 6 illustrates a correlation map plot for two successive images of a medium contrast scene with horizontal content.
Figure 7:
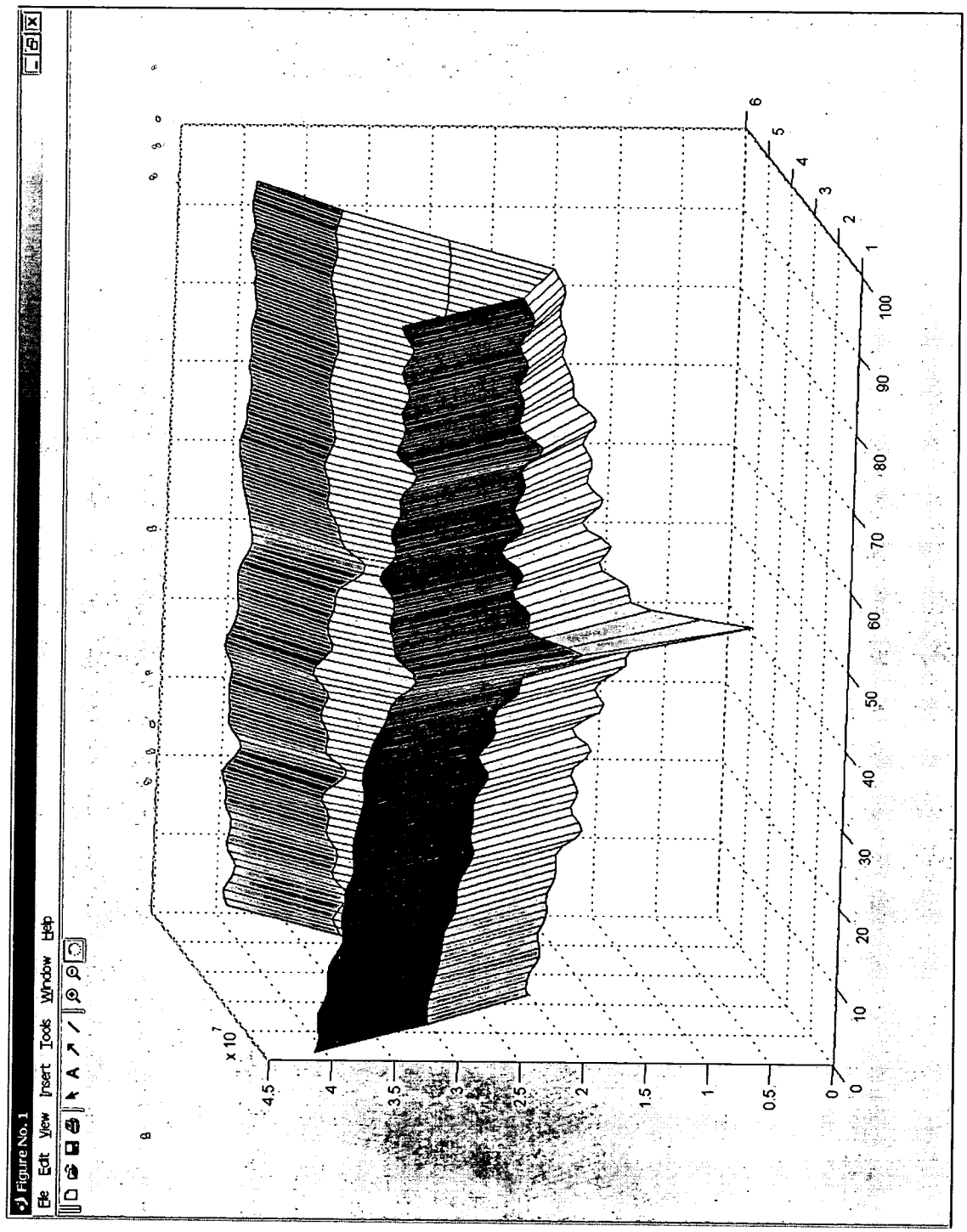
FIG. 7 illustrates a correlation map plot for two successive images of a lower contrast scene.
Figure 8:
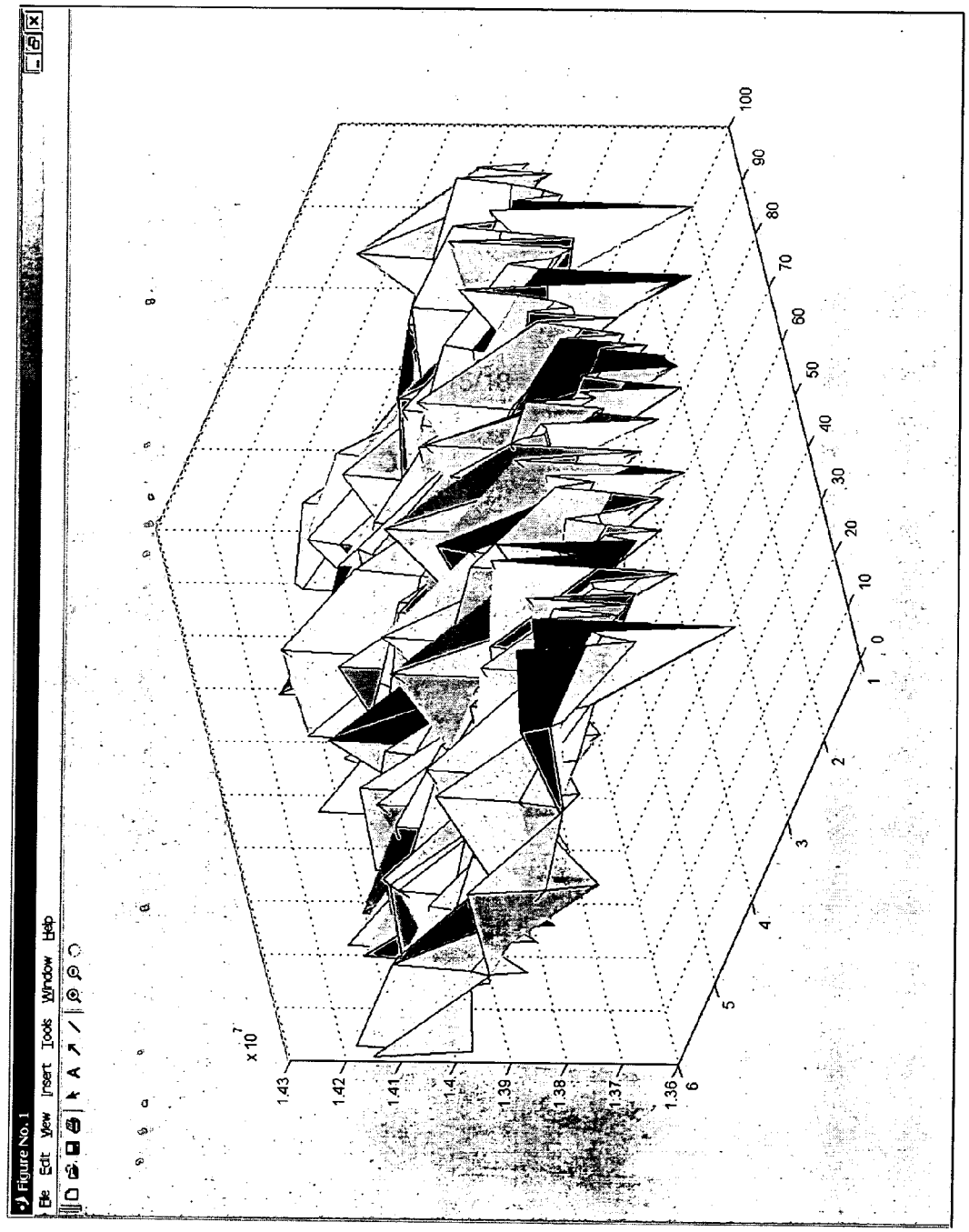
FIG. 8 illustrates a correlation map plot for two successive images of a flat scene without using a noise filter.
Figure 9:
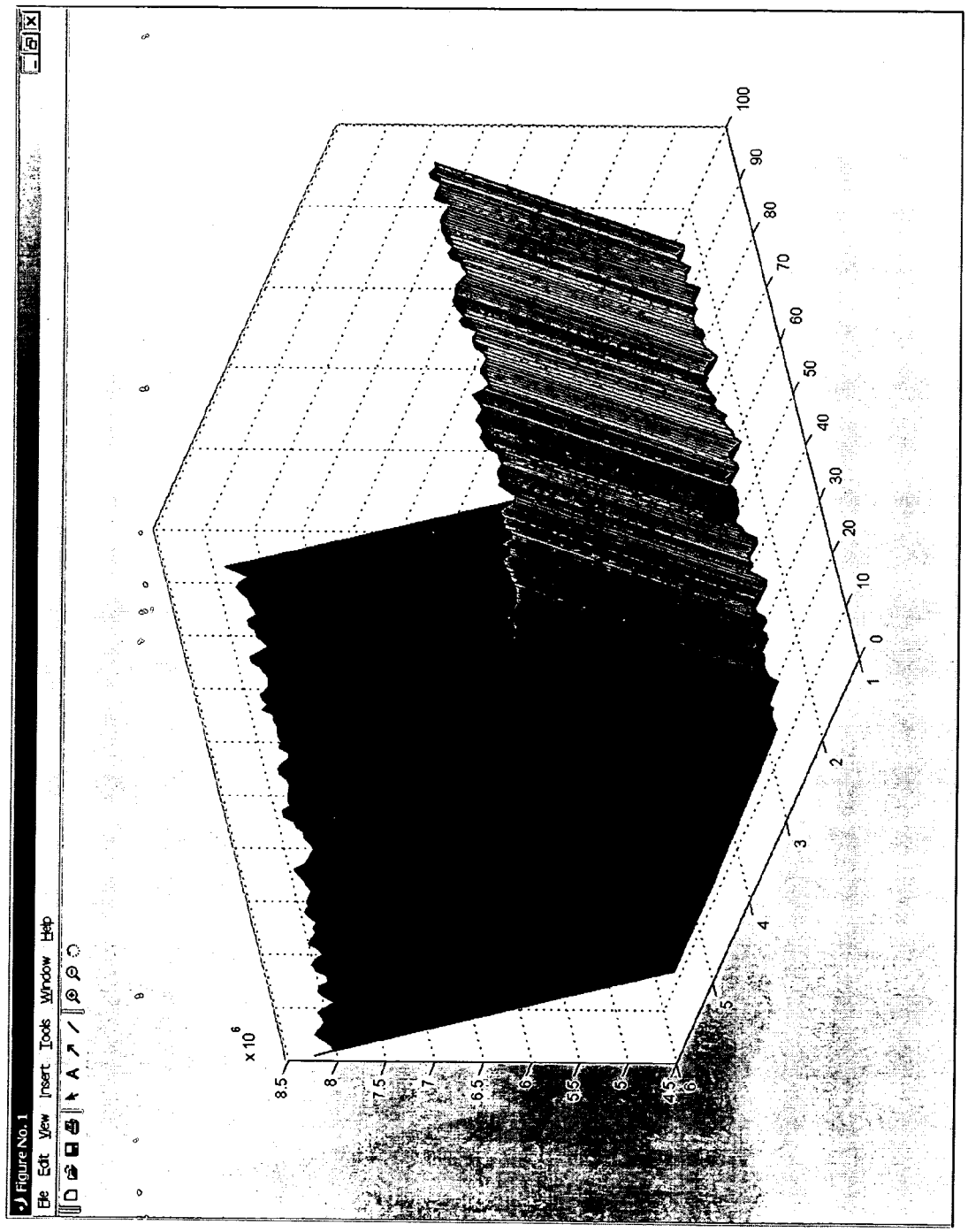
FIG. 9 illustrates a correlation map plot for two successive images of the flat scene using a noise filter.

The plot shown in FIG. 5 represents a typical outdoor scene that has many high contrast edges. The lowest point in the bowl (bottom of the plot) is the location of best correlation. FIG. 6 illustrates a correlation map plot for two successive images of a medium contrast scene with content that varies horizontally. FIG. 7 illustrates a correlation map plot for two successive images of a lower contrast scene. FIG. 8 illustrates a correlation map plot for two successive images of a flat scene without using a noise filter. FIG. 9 illustrates a correlation map plot for two successive images of the flat scene using a noise filter.

Figure 10:
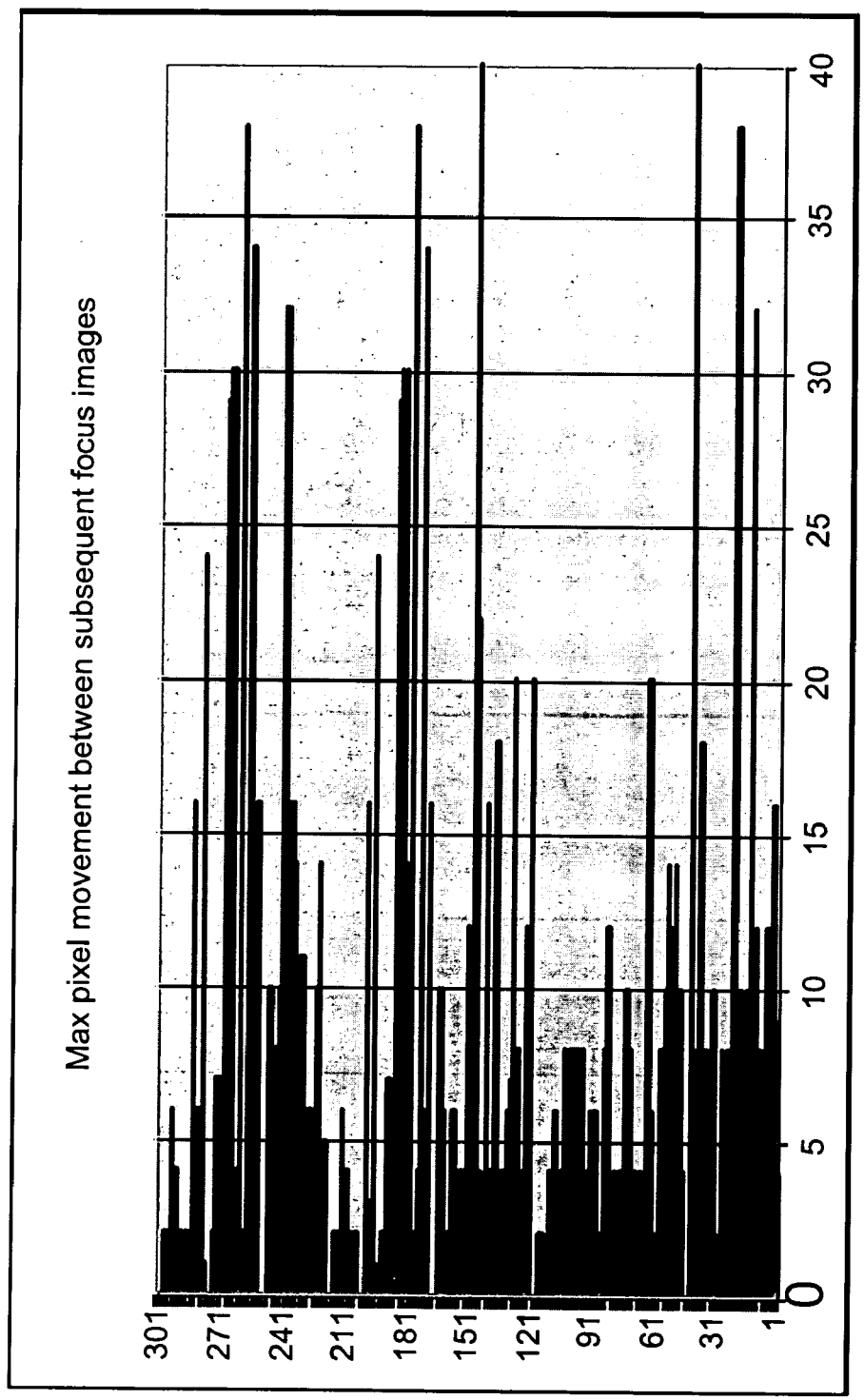
FIGS. 10 and 11 illustrate summary plot showing pixel motion from 300 test photographs.
Figure 11:
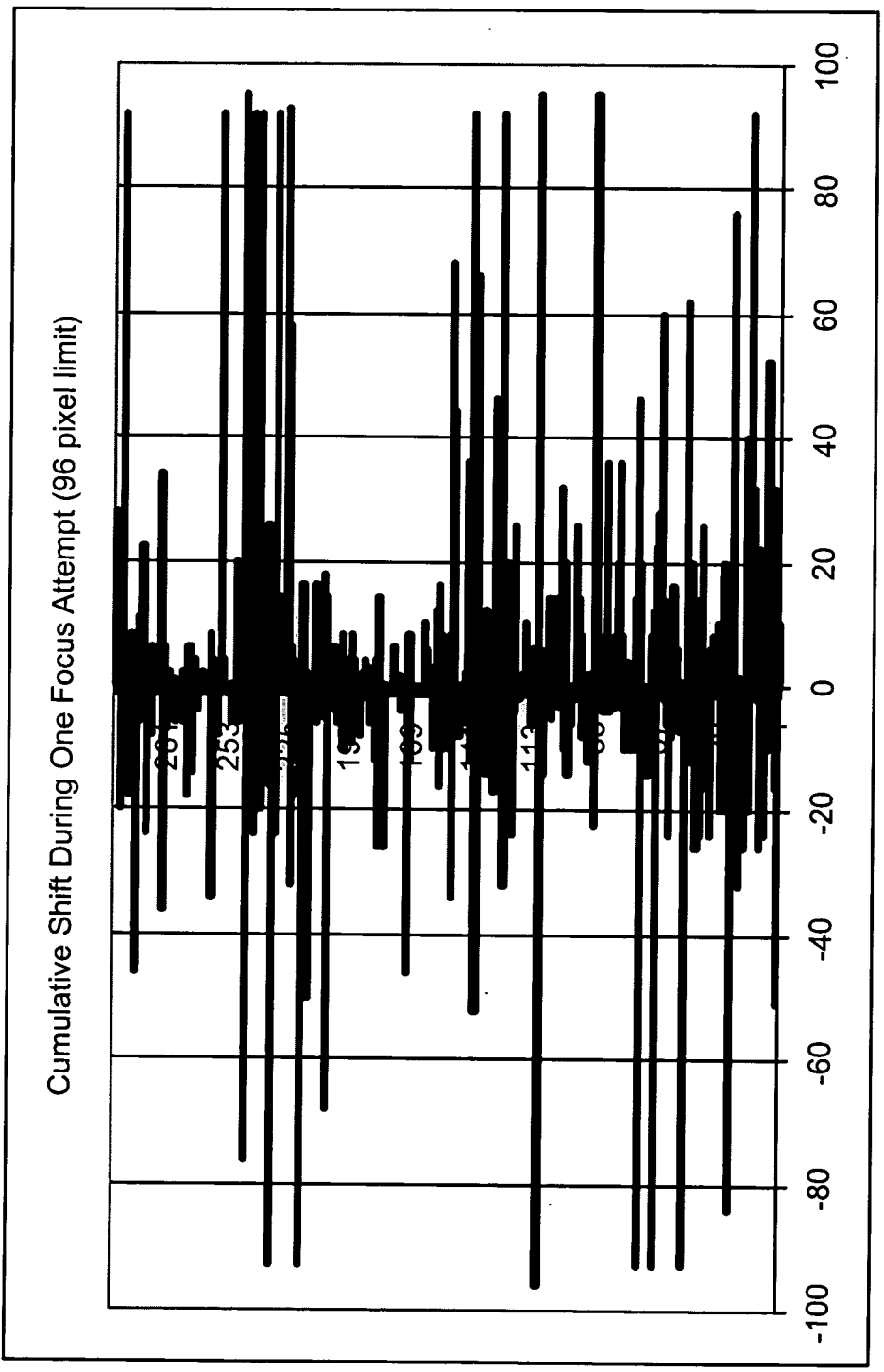

FIGS. 10 and 11 illustrate summary plots showing pixel motion from 300 test photographs. FIG. 10 illustrates the maximum pixel movement between successive focus images. FIG. 11 shows the cumulative shift during one focus attempt.

The present method does not require additional camera hardware and is simple to implement using a digital signal processor, for example, normally employed in digital cameras. In particular, the present invention may be implemented in firmware which requires no extra hardware. Better auto-focus results are achieved using the present invention under all lighting conditions. The present invention helps more at high zoom levels, because hand held camera motion is magnified as zoom levels increase.

From the foregoing, it should be clear that the present invention provides for improved auto-focus in a digital camera 10 by stabilizing successive images using image correlation 52. Each auto-focus image is correlated 52 to previous images so that scene movement can be tracked. Detecting this motion typically involves comparing two separate focus frames to determine the direction and speed of the motion. The area in the scene where focus figure-of-merit is computed is adjusted 53 according to the amount of scene movement. Thus, the respective figures-of-merit calculated for sequential focus captures use the same scene location, making it easier to determine the best possible focus motor position. This improves the accuracy of the focus figure-of-merit which results in fewer autofocus failures, and achieves a better autofocus result.

Thus, digital cameras and methods that provide for stabilized auto-focus images have been disclosed. It is to be understood that the above-described embodiments are merely illustrative of some of the many specific embodiments that represent applications of the principles of the present invention. Clearly, numerous and other arrangements can be readily devised by those skilled in the art without departing from the scope of the invention.

What is claimed is:

1. A digital camera comprising:
    an image sensor for sensing images;
    a focus lens;
    a focus motor coupled to the focus lens for controlling the position thereof;
    processing circuitry coupled to the focus motor and image sensor;

firmware embodied in the processing circuitry that comprises an autocalibration algorithm that:

takes a successive number of auto-focus images, each at a unique position of the focus lens;

correlates each respective auto-focus image with a portion of a reference image to track scene motion;

tracks scene motion between the images by overlaying a portion of a reference image onto a current image and performs a pixel by pixel subtraction, wherein the reference image is at least one of a most recent image or an image that was recorded closest to a current focus lens position;

adjusts the position of the area in the image where focus figure-of-merit is computed according to the amount of scene motion that is determined so that respective figures-of-merit are calculated for sequential auto-focus images using the same scene location, wherein the auto-focus images are stabilized so that the computed figure-of-merit relates to consistent scenes between iterations of the autocalibration algorithm and wherein the computed figure-of-merit is offset according to an amount of motion occurring so that the figure-of-merit is performed on a stabilized image; and moves the focus lens to the location that produces the highest figure-of-merit.

2. The camera recited in claim 1 wherein the firmware correlates the images by comparing an area of each image where focus figure-of-merit is computed to a corresponding area in the reference image to determine the direction and speed of the motion between the images.

3. A digital camera comprising:

sensing means for sensing images; and focusing means for focusing the camera at different distances;

processing means coupled to the sensing means and focusing means for controlling operation thereof, and that comprises an autocalibration algorithm that:

takes a successive number of auto-focus images, each at a unique position of the focus lens;

correlates each respective auto-focus image with a portion of a reference image to track scene motion;

tracks scene motion between the images by overlaying a portion of a reference image onto a current image and performs a pixel by pixel subtraction, wherein the reference image is at least one of a most recent image or an image that was recorded closest to a current focus lens position;

adjusts the position of the area in the image where focus figure-of-merit is computed according to the amount of scene motion that is determined so that respective figures-of-merit are calculated for sequential auto-focus images using the same scene location, wherein the auto-focus images are stabilized so that the computed figure-of-merit relates to consistent scenes between iterations of the autocalibration algorithm and wherein the computed figure-of-merit is offset according to an amount of motion occurring so that the figure-of-merit is performed on a stabilized image; and moves the focus lens to the location that produces the highest figure-of-merit.

4. The camera recited in claim 3 wherein the firmware correlates the images by comparing an area of each image where focus figure-of-merit is computed to a corresponding area in the reference image to determine the direction and speed of the motion between the images.

5. A stabilization method for use with a digital camera, the method comprising:

taking a successive number of auto-focus images, each at a unique position of the focus lens;

correlating each respective auto-focus image with a portion of a reference image to track scene motion;

tracking scene motion between the images by overlaying a portion of a reference image onto a current image and performing a pixel by pixel subtraction, wherein the reference image is at least one of a most recent image or an image that was recorded closest to a current focus lens position;

adjusting the position of the area in the image where focus figure-of-merit is computed according to the amount of scene motion that is determined so that respective figures-of-merit are calculated for sequential auto-focus images using the same scene location, wherein the auto-focus images are stabilized so that the computed figure-of-merit relates to consistent scenes between iterations of the autocalibration algorithm and wherein the computed figure-of-merit is offset according to an amount of motion occurring so that the figure-of-merit is performed on a stabilized image; and moving the focus lens to the location that produces the highest figure-of-merit.

6. The method recited in claim 5 wherein correlation is implemented by comparing an area of each image where focus figure-of-merit is computed to a corresponding area in the reference image to determine the direction and speed of the motion between the images.

7. The camera recited in claim 1 wherein the autocalibration algorithm computes a focus figure-of-merit comprising a measure of focus quality.

8. The camera recited in claim 3 wherein the autocalibration algorithm computes a focus figure-of-merit comprising a measure of focus quality.

9. The method recited in claim 5 wherein the autocalibration algorithm computes a focus figure-of-merit comprising a measure of focus quality.

* * * * *